2,799,618

GLYCOSIDAL MATERIAL HAVING ACTIVITY ON THE HEART AND VASCULAR VESSELS AND ITS PREPARATION FROM PLANT SOURCES

Theodor Bersin and Arthur Mueller, Sankt Gallen, Switzerland, assignors, by mesne assignments, to Hausmann Laboratories Ltd., Sankt Gallen, Switzerland, a corporation of Switzerland No Drawing. Application April 7, 1955, Serial No. 500,036

11 Claims. (Cl. 167—65)

Extracts of plant materials containing non-digitaloid substances have a tonic effect on the heart, expand the blood vessels and inhibit decompensation of the heart weakened by age or infectious diseases. Extracts of the hawthorn (*Crataegus oxyacantha* L. and *Crataegus monogyna*) are known, and their pharmaceutical activity has been extensively studied; see, for example, the following publications: J. D. P. Graham in the Quart. J. Pharm. Pharmacol., vol. 13 (1940), page 49; and Brit. Med. Journ., 1939, II, page 951. Moreover, other plants, such as the leaves of the wine grape, the rhizome of ferns, and the peanut and kola nuts, all contain similar substances.

In spite of extensive efforts to isolate these substances, it has not, so far, been possible to establish their nature. See, for example, the publications of H. Neugebauer, Pharm., vol. 4 (1949), pages 49 and 284; R. Ullsperger, Pharm., vol. 6 (1951), page 141; H. Schindler, Arch. Pharm., vol. 284 (1951), page 132; and R. Tschesche and R. Fugmann in Chem. Ber., vol. 84 (1951), page 810. As Th. Bersin and A. Mueller in their publications in Helv. Chim. Acta., vol. 34 (1951), page 1868; and vol. 35 (1952), page 1891 have shown, the "Crataegussäure" of L. Bachler (dissertation, University of Basel, 1927) consists predominantly of ursolic acid, oleanolic acid and β-sitosterol, and is not identical with the principal active material of the hawthorn. It was therefore surprising and not to be foreseen that this heart-active material with the characteristics of the leucoanthocyanins (glycosides) can be easily isolated by the process described below, and that it exhibits strong vitamin P activity. The end product can be characterized as a qualitatively-constant mixture of the glycosides of the substituted α,γ-diphenylpropane-1,2-diol-3-one of the general formula

$$(RO)_m C_6 H_{5-m}.CHOR.CHOR.CO.C_6 H_{5-n}(OR)_n$$

where R represents H, CH₃ or a sugar residue, and where m and n are integers. It can also be present in the tautomeric flavane form. This active material, on treatment with an acid, is first split into a sugar and aglycone, which latter changes to a red anthocyan. Treatment with warm alkali yields red phlobaphene (auto-oxidation). With heavy metal salts and certain proteins, difficultly soluble compounds are formed. It is precipitated by lead salts and destroyed by yeast enzymes. The activity can be pharmacologically tested on the frog heart, dogs, guinea pigs and rabbits, and in the recovery test on embryonic chick hearts.

The starting material—fresh leaves, berries, blossoms, fruit, hulls, rhizomes—is first submitted to a thermal inactivation of the enzymes which destroy the active material, and the material which is extracted with hydroxyl-containing solvents is then treated with lipoid solvents in order to separate inactive materials which are loosely combined with the active material. The residue, freed from solvent, avoiding the use of mineral acids and oxidizing agents, is again dissolved in the hydroxyl-containing solvent and precipitated by means of a precipitating agent which is insoluble in water but soluble in alcohol. Advantageously, ether is employed as the precipitant. After drying the resulting precipitate, the product is further worked up in the usual way for therapeutic use, for instance as an injectable solution of great stability in propylene glycol, the properties of the material being taken into consideration, i. e., its auto-oxidizability, its sensitivity to acids and alkalies, etc. The propylene glycol content of suitable injectable solutions should be 50 vol./vol. percent (āā).

Example 1

100 parts of freshly picked hawthorn leaves were boiled for one-half hour under reflux with 100 parts of industrial spirits or isopropanol in order to inactivate the hydrolases and redoxases. The residue was separated by pressing, ground, allowed to stand for three days with the same amount of spirit or isopropanol, and then percolated with the same solvent. The expressed liquid and the percolate were evaporated in vacuo at a temperature of 35–50° C. and the residue was comminuted. The residue from the alcohol extract was freed of inactive constituents by extraction with ether or methylene chloride. The ether-insoluble fraction was powdered under moisture-free conditions, and then extracted several times with an absolute water-free aliphatic carboxylic acid, as for example with glacial acetic acid. As an illustration, 100 parts of the ether-insoluble fraction of the extract recovered by means of alcohol from the hawthorn leaves was shaken with 500 parts of glacial acetic acid at room temperature, then filtered under suction, again shaken or stirred with 400 parts of glacial acetic acid, again filtered under suction, and extracted for the third time with 300 parts of glacial acetic acid. The glacial acetic acid extracts were then discarded. The residue of 13 parts was washed with ether or with methylene chloride, dried and, after being dissolved in alcohol, precipitated from the alcoholic solution by the addition thereto of ether. The process, as described, can also be used starting with berries and blossoms of the hawthorn. The product is a light brown powder of the active glycoside, and the yield is 7 percent. In the recovery test on spontaneously insufficient embryonic chick hearts it shows the highest activity of all the hawthorn constituents (3 micrograms per milliliter). The substance yields a crystalline dinitrophenylhydrazone, melting point 107° C.

Example 2

2.6 parts of red-brown peanut hulls were stabilized by boiling in 100 parts of alcohol and extracted. The filtered red extract was concentrated by evaporation, the residue defatted with ether, dissolved in methanol, and precipitated by the addition of ether. The resulting product has the same properties as the preparation obtained from hawthorn in accordance with the procedure described in Example 1.

We claim:

1. The process of recovering a glycoside of substituted α,γ-diphenylpropane-diol-one having heart- and vascular-activity from vegetable materials which comprises subjecting said vegetable material, after thermal treatment to inactivate enzymes, to treatment with an alcohol selected from the group consisting of ethanol and methanol under conditions wherein the presence of mineral acids and oxidizing agents is avoided, freeing the resulting extract from said solvent and separating lipoid material therefrom by treatment thereof with glacial acetic acid, redissolving said extract in said alcohol, and precipitating the active product from the resulting solution by the addition thereto of ether.

2. The process of recovering a glycosidic material having activity on the heart and vascular system from vegetable materials, which comprises: boiling a plant material consisting of hawthorn leaves with an alcohol selected from the group which consists of industrial spirits and isopropanol, thereby inactivating enzymes capable of destroying said active materials which are present in said plant material; treating the residue with an alcohol selected from the group which consists of industrial spirits and isopropanol; evaporating the resulting alcoholic extracts at a reduced pressure less than atmospheric and at a temperature within the range 35–50° C., thereby securing a dry residue; removing inactive constituents from said dry residue by treating said residue with a solvent selected from the group which consists of ether and methylene chloride; extracting said insoluble fraction remaining with glacial acetic acid; discarding the resulting extract and washing the dry residue remaining with a solvent selected from the group which consists of ether and methylene chloride; dissolving the dry residue in alcohol; and precipitating said active glycosidic material from said alcoholic solution by adding ether thereto.

3. The process as defined in claim 2 wherein said insoluble fraction is treated several times with glacial acetic acid, and all of said extracts secured by said treatment are discarded.

4. The process of recovering a glycosidic material having activity on the heart and vascular system from plant materials which comprises treating a plant material consisting of freshly picked hawthorn leaves with a boiling alcohol selected from the group which consists of industrial spirits and isopropanol, thereby inactivating enzymes present therein which would destroy said active material; further treating said plant material with said alcohol selected from the group which consists of industrial spirits and isopropanol in order to further extract said active material therefrom; combining said alcoholic extracts, and evaporating them at a reduced pressure, less than atmospheric, and at a temperature within the range 35–50° C., thereby securing a dry residue; treating said residue with a lipoid solvent in order to separate therefrom inactive substances which are loosely combined with said active material; freeing the resulting residue from solvent and redissolving said residue in an alcohol; and precipitating said active material from said alcoholic solution by adding ether thereto.

5. The process defined in claim 4 wherein the use of mineral acids and oxidizing agents is avoided during said step of redissolving said residue in an alcohol selected from the group consisting of industrial spirits and isopropanol.

6. The process defined in claim 4 wherein said lipoid solvent is glacial acetic acid.

7. The process of recovering a glycosidic material having activity on the heart and vascular system from a vegetable material, which comprises treating a vegetable material selected from the group consisting of hawthorn leaves and red-brown peanut hulls with an alcohol selected from the group consisting of industrial spirits and isopropanol at an elevated temperature, thereby securing an extract of the active material; concentrating said extract by evaporation, thereby securing a solid residue; defatting said residue by treating it with a liquid solvent; dissolving the resulting defatted residue in an alcohol; and precipitating the active material from said alcoholic solution by adding ether thereto.

8. The process of recovering a glycosidic material having activity on the heart and vascular system from peanut hulls, which comprises treating said peanut hulls with boiling alcohol, thereby stabilizing the resulting extract; concentrating said extract by evaporation, thereby securing a solid residue; defatting said residue by treating it with a lipoid solvent; dissolving the defatted residue in methanol; and precipitating said active material from the resulting solution by adding ether thereto.

9. A therapeutic agent active on the heart and vascular system which comprises a qualitatively-constant mixture of the glycosides of the substituted α,γ-diphenylpropane-1,2-diol-3-one of the general formula:

(RO)$_m$C$_6$H$_{5-m}$.CHOR.CHOR.CO.C$_6$H$_{5-n}$(OR)$_n$ where R is a radical selected from the group which consists of hydrogen, methyl and sugar residues, and $m$ and $n$ each represents integers which may be the same or different integers.

10. A therapeutic agent active on the heart and vascular system which comprises a qualitatively-constant mixture of the glycosides of the substituted α,γ-diphenylpropane-1,2-diol-3-one of the general formula:

(RO)$_m$C$_6$H$_{5-m}$.CHOR.CHOR.CO.C$_6$H$_{5-n}$(OR)$_n$ where R is a radical selected from the group which consists of hydrogen, methyl and sugar residues, and $m$ and $n$ each represents integers which may be the same or different integers, said glycosidic material being capable of occurring in the tautomeric cyclic flavane form and forming a dinitrophenylhydrazone which melts at 107° C.

11. A therapeutic agent active on the heart and vascular system which comprises an injectable solution in propylene glycol of a qualitatively-constant mixture of the glycosides of the substituted α,γ-diphenylpropane-1,2-diol-3-one of the general formula:

(RO)$_m$C$_6$H$_{5-m}$.CHOR.CHOR.CO.C$_6$H$_{5-n}$(OR)$_n$ where R is a radical selected from the group which consists of hydrogen, methyl and sugar residues, and $m$ and $n$ each represents integers which may be the same or different integers.

References Cited in the file of this patent

Neu: Naturwissenachaften, 40 (1953), page 226 (48 C.A. 10743d, 1954).

Neugebauen: Pharmazie, 4 (1949), pp. 29–30 (43 C.A. 5906F, 1949). (Copy of article in 260–210.)